United States Patent [19]
Gelb
[11] Patent Number: 5,041,197
[45] Date of Patent: Aug. 20, 1991

[54] $H_2/Cl_2$ FUEL CELLS FOR POWER AND HCL PRODUCTION - CHEMICAL COGENERATION

[75] Inventor: Alan H. Gelb, Boston, Mass.
[73] Assignee: Physical Sciences, Inc., Andover, Mass.

[21] Appl. No.: 303,026
[22] Filed: Jan. 25, 1989

Related U.S. Application Data

[63] Continuation of Ser. No. 47,007, May 5, 1987, abandoned.

[51] Int. Cl.[5] .......... C25B 1/02; H01M 8/04
[52] U.S. Cl. .......... 204/128; 204/129; 204/DIG. 4; 429/17; 429/19
[58] Field of Search .......... 204/128, 129, DIG. 4; 429/19, 17

[56] References Cited

U.S. PATENT DOCUMENTS 3,859,196 1/1975 Ruthel et al. .......... 204/278
3,864,226 2/1975 Spitzer .......... 204/98
3,864,236 2/1975 Lindstrom .......... 204/265
3,930,980 1/1976 De Nora et al. .......... 204/256
3,959,095 5/1976 Marks et al. .......... 204/98
3,962,065 6/1976 Scoville .......... 204/256
3,976,549 8/1976 Falvo .......... 204/1 R
3,990,975 11/1976 Hoekje et al. .......... 204/128
3,996,118 12/1976 Sanders .......... 204/91
3,996,957 12/1976 Goldish et al. .......... 137/224
4,000,057 12/1976 Mrazek et al. .......... 204/296
4,032,415 6/1977 Sanders .......... 204/78
4,036,714 7/1977 Spitzer .......... 204/99
4,048,046 9/1977 MacMullin .......... 204/266
4,059,495 11/1977 de Nora et al. .......... 204/98
4,061,555 12/1977 Cook, Jr. et al. .......... 204/98
4,062,753 12/1977 Falvo .......... 204/266
4,073,715 2/1978 De Nora et al. .......... 204/256
4,078,978 3/1978 Zirngiebl .......... 204/98
4,107,005 8/1978 D'Agostino et al. .......... 204/98
4,108,742 8/1978 Seko et al. .......... 204/98
4,113,585 9/1978 Resnick et al. .......... 204/98
4,128,701 12/1978 Maricle .......... 429/21
4,130,468 12/1978 De Nora et al. .......... 204/98
4,140,615 2/1979 Kadija et al. .......... 204/266
4,142,950 3/1979 Creamer et al. .......... 204/96
4,146,446 3/1979 Von Sturm .......... 204/129
4,161,438 7/1979 De Nora et al. .......... 204/266
4,166,780 9/1979 Bianchi et al. .......... 204/99
4,194,179 3/1980 Malinouskas .......... 340/211
4,196,068 4/1980 Scoville .......... 204/255
4,197,179 4/1980 Ezzell et al. .......... 204/255
4,209,369 6/1980 Seko et al. .......... 204/98
4,212,714 7/1980 Coker et al. .......... 204/98
4,214,957 7/1980 Ogawa et al. .......... 204/98
4,234,419 11/1980 Coillet .......... 210/664
4,246,078 1/1981 Broniewski .......... 204/DIG. 4
4,255,246 3/1981 Davis et al. .......... 204/228
4,268,365 5/1981 Tijima et al. .......... 204/98

(List continued on next page.)

*Primary Examiner*—John F. Niebling
*Assistant Examiner*—Kathryn Gorgos
*Attorney, Agent, or Firm*—Weingarten, Schurgin, Gagnebin & Hayes

[57] ABSTRACT

A fuel cell for the electrolytic production of hydrogen chloride and the generation of electric energy from hydrogen and chlorine gas is disclosed. In typical application, the fuel cell operates from the hydrogen and chlorine gas generated by a chlorine electrolysis generator. The hydrogen chloride output is used to maintain acidity in the anode compartment of the electrolysis cells, and the electric energy provided from the fuel cell is used to power a portion of the electrolysis cells in the chlorine generator or for other chlorine generator electric demands. The fuel cell itself is typically formed by a passage for the flow of hydrogen chloride or hydrogen chloride and sodium chloride electrolyte between anode and cathode gas diffusion electrodes, the HCl increasing in concentration in the flow direction. Hydrogen and chlorine gases are supplied respectively through the anode and cathode gas diffusion electrodes to the electrolyte of hydrogen chloride in the region between the electrodes. The disruptive effect of chloride ions on the hydrogen gas to hydrogen ion reaction is inhibited.

20 Claims, 1 Drawing Sheet

U.S. PATENT DOCUMENTS 4,269,675 5/1981 Ezzell et al. .......................... 204/98
4,272,338 6/1981 Lynch et al. .......................... 204/98
4,273,626 6/1981 Ezzell et al. .......................... 204/98
4,295,944 10/1981 Satoh et al. .......................... 204/98
4,323,434 4/1982 Yoshida et al. .......................... 204/98
4,331,521 5/1982 Chisholm et al. .......................... 204/98
4,336,115 1/1982 Selby, III et al. .......................... 204/98
4,340,452 7/1982 De Nora et al. .......................... 204/129
4,341,604 7/1982 De Nora et al. .......................... 204/98
4,341,612 7/1982 Oda et al. .......................... 204/253
4,343,689 8/1982 De Nora et al. .......................... 204/253
4,354,905 10/1982 Yoshida et al. .......................... 204/98
4,374,711 2/1983 Ogawa .......................... 204/98
4,399,009 8/1983 Chisholm .......................... 204/98
4,426,271 1/1984 Yoshida et al. .......................... 204/296
4,426,272 1/1984 Hanmer .......................... 204/296
4,444,632 4/1984 De Nora .......................... 204/98
4,457,815 7/1984 Levin .......................... 204/98
4,459,188 7/1984 Rutherford et al. .......................... 204/98
4,461,682 7/1984 Oda et al. .......................... 204/98
4,468,301 8/1984 Oda et al. .......................... 204/98
4,482,278 12/1984 Oda et al. .......................... 204/98
4,486,276 12/1984 Cohn et al. .......................... 204/98
4,496,451 1/1985 Ishii et al. .......................... 204/252
4,496,452 1/1985 Bianchi .......................... 204/266
4,498,961 2/1985 Lazarz et al. .......................... 204/98
4,510,026 4/1985 Spaziante .......................... 204/95
4,518,457 5/1985 Gray .......................... 156/656
4,518,470 5/1985 Oda et al. .......................... 204/98
4,521,289 6/1985 Iijima et al. .......................... 204/253
4,526,663 7/1985 Yoshida et al. .......................... 204/98
4,530,743 7/1985 De Nora .......................... 204/98
4,532,018 7/1985 Wright et al. .......................... 204/98
4,533,453 8/1985 Oda et al. .......................... 204/252
4,649,091 3/1987 McElroy .......................... 429/26

CATHODE
40
ANODE
1/2(H2 + Cl2 → HCl
H2/Cl2 FUEL CELL
e⁻
44
46
26, Cl2
42, HCl
14
12
28, H2
NaCl + H2O
NaOH2
1/2(Cl2 + H2)
ELECTROLYSIS CELL
e⁻
e'
22
24
ANODE
18
30
16
20
CATHODE
POWER SUPPLY
DRIVEN LOOP
GENERATING LOOP (1 −1.36 V)
32
EXTERNAL POWER NETWORK 80
e⁻
e⁻
DILUTE HCl
68
72
74
H2
Cl2
62
64
ANODE (GAS DIFFUSION)
H2 → 2H⁺ + 2e⁻
CATHODE (GAS DIFFUSION)
Cl2 + 2e⁻ → 2Cl
H⁺
Cl⁻
H⁺
76
78
66
60
SOLID POLYMER ELECTROLYTE, 82
70
CONCENTRATED HCl

92
FUEL CELL
94
MAINS SUPPLY
90
90
90
90

$H_2/C\ell_2$ FUEL CELLS FOR POWER AND HCL PRODUCTION - CHEMICAL COGENERATION

This invention was made with Government support under Contract No. DE-AC02-86ER80366 with the Department of Energy and the United States Government has certain rights thereto.

This application is a continuation of application Ser. No. 07/047,007, filed May 5, 1987 now abandoned Jan. 25, 1989.

FIELD AND BACKGROUND OF THE INVENTION

The present invention relates to fuel cells, and in particular, the production of electricity and hydrogen chloride from the conversion of hydrogen and chlorine gas to hydrogen and chloride ions in a hydrochloric acid or hydrochloric acid and sodium chloride solution.

A substantial industry exists in this country and worldwide for the generation of chlorine gas for industrial uses by electrolysis of a sodium chloride electrolyte. Such plants typically additionally produce sodium hydroxide or caustic soda which, has industrial applications, and hydrogen gas which, in the main, is considered a waste product and burned for release to the environment. Such chlorine generators are typically with a cation selective membrane or porous diaphragm barrier in the electrolyte between the anode and cathode electrodes, and the electrolyte on the anode side of the barrier, where chlorine gas is generated in the oxidation portion of the electrolysis reaction, must be maintained in a slightly acidic condition in order to prevent oxygen generation and other parasitic reactions. Typically, the acidity of the anode region is maintained by burning a small portion of the hydrogen and chlorine gases generated by the chlorine generator system in a reactor from which the resulting hydrogen chloride is fed back to the anode region of the electrolysis cell or cells in the chlorine generator.

In U.S. Pat. No. 4,336,115 there is disclosed a system where, in the production of chlorine gas by electrolysis, the hydrogen and chlorine or other halogen gases are reacted in a catalytic reaction to form the corresponding acid. In U.S. Pat. No. 3,864,236 a reversable electrolyte cell is disclosed for the production of either chlorine or hydrogen chloride. Neither of these references address the loss of energy employed in dealing with the waste products or in the hydrogen chloride generation for the chlorine electrolysis process.

BRIEF SUMMARY OF THE INVENTION

In accordance with the teaching of the present invention, a fuel cell is provided for the production of hydrogen chloride and electrical energy from hydrogen and chlorine gases. In a typical application the hydrogen and chlorine gases are obtained by diverting a small percentage of the chlorine from a electrolysis chlorine generator along with a portion of the hydrogen waste stream. These are applied to the fuel cell of the present invention along with a dilute hydrogen chloride or dilute hydrogen chloride and sodium chloride solution. Electrical energy is produced as an output of the electrodes of the fuel cell, and a concentrated hydrogen chloride solution is taken as an output stream from the fuel cell. The thus produced hydrogen chloride is then returned to the anode region of the electrolysis chlorine generator cells to maintain an anode acidity that prevents the degeneration of the anode reaction into an oxygen generation. The electrical energy provided as an output from the fuel cell electrodes, being of a direct current nature, may typically be applied to a selected portion of the electrolysis cells to drive the electrolysis reaction in those cells, thereby reducing the electrical energy demand for the chlorine generator that must be commercially purchased.

The fuel cell according to the present invention in typical application comprises one or more cells in which a flow of hydrogen chloride or hydrogen chloride and sodium chloride electrolyte is established between anode and cathode gas diffusion electrodes. Hydrogen and chlorine gases are applied to the electrode surfaces opposite from the surfaces bordering the electrolyte solution and transport through the diffusion electrodes, permitting the respective oxidation and reduction reactions at the anode and cathode to proceed, increasing the hydrogen chloride concentration. At the end of the flow, concentrated hydrogen chloride or concentrated hydrogen chloride and sodium chloride is removed. The electrodes will drive an electron flow from anode to cathode outside of the electrolyte solution as a result of the energy of formation of the hydrogen chloride from the anode and cathode reactions.

In order to prevent poisioning of the anode reaction by chloride ions, a barrier cation-selective membrane, typically a solid polymer electrolyte, is placed over the anode electrode. This membrane prevents the migration of chloride ions to the region adjacent the anode electrode where the hydrogen to hydrogen ion oxidation reaction takes place.

The anode and cathode electrodes are preferably metals of catalytic activity with respect to the oxidation and reduction reactions of converting hydrogen and chlorine gases to the respective ions with the respective release and absorption of electrons. For this purpose a graphitic electrode having a high microstructure surface area relative to the geometric surface area of the electrode as a whole is typically employed. Either or both electrodes may be platinum coated to achieve a platinum loaded carbon surface structure.

The resulting fuel cell, which sacrifices reversability for efficiency, achieves a high level of effectiveness in conversion of hydrogen and chlorine into hydrogen chloride with a efficient capture of the energy of formation as an electrical output. The electrical and hydrogen chloride outputs are advantageously utilized back in the electrolysis chlorine generator for anode acidification and for energy driving the HCl dissociation, but may be utilized in other applications as well.

BRIEF DESCRIPTION OF THE DRAWING

These and other features of the present invention are more fully set forth below in the solely exemplary detailed description and accompanying drawing of which.

DETAILED DESCRIPTION

The present invention contemplates a hydrogen/-chlorine fuel cell in which hydrogen and chlorine inputs are converted to hydrochloric acid and electrical energy outputs. In one typical application these outputs are utilized respectively to maintain acidity at the anode of an electrolysis chlorine generator and to supplement the commercially supplied electrical energy used to drive the electrolysis reaction of the chlorine generator.

Figure 1:
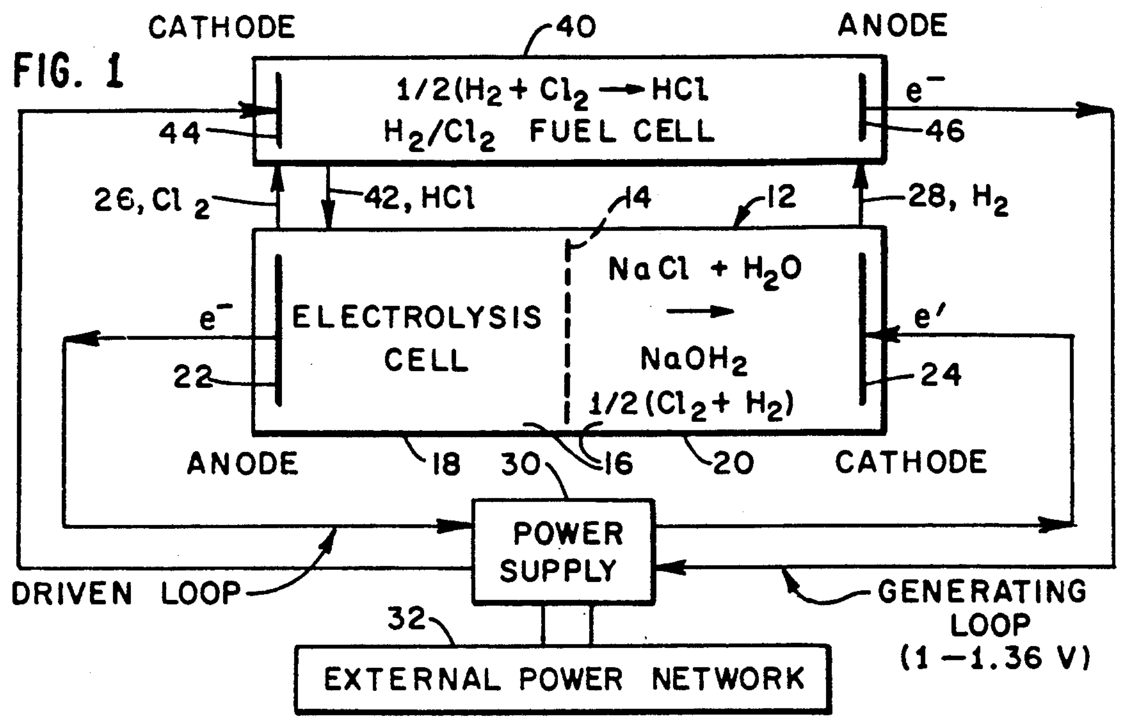
FIG. 1 is a systems diagram of the fuel cell of the present invention in the application of supplying hydrogen chloride for anode acidification and electrical energy for electrolysis to an electrolysis based chlorine generator.

The fuel cell of the present invention, operative in relation to an electrolysis chlorine generator, is illustrated in FIG. 1. As shown there, an electrolysis, based chlorine generator 12 of the diaphragm or membrane technology is shown having a central membrane 14 which divides sodium chloride and water electrolyte region 16 into first and second chambers 18 and 20. An anode electrode 22 is placed in the chamber 18 while a cathode electrode 24 is placed in the electrolyte chamber 20. Separate outputs 26 and 28 respectively of chlorine and hydrogen gas are provided from the electrolysis cell 12. Electrical energy for driving the chambers 18 and 20 electrolysis reaction of the cell 12 is provided to the electrodes 22 and 24 from a power supply 30 which receives commercially available electricity from an external power network 32.

Commercial chlorine generation by electrolysis is typically accomplished in a plurality of cells, each one having a general form represented by the cell 12. For purposes of the present disclosure, the plural cells are collectively represented by the single cell 12. Such chlorine generation electrolysis cells are well known in the art and require no further description.

According to the present invention, a fuel cell 40 is provided and advantageously cooperates with the electrolysis generator 12 to provide an input 42 of hydrogen chloride for acidifying the chamber 18 in the vicinity of the anode electrode 22 to prevent the oxidation reaction that generates chlorine from degenerating into the generation of oxygen. Additionally, electrical energy is provided by electrodes 44 and 46 of the fuel cell 40 which are utilized, through the power supply 30, or other means, to reduce the amount of electrical energy which must be purchased from the external power network 32 and thereby improve the cost effectiveness of the electrolysis generator 12.

Figure 2:
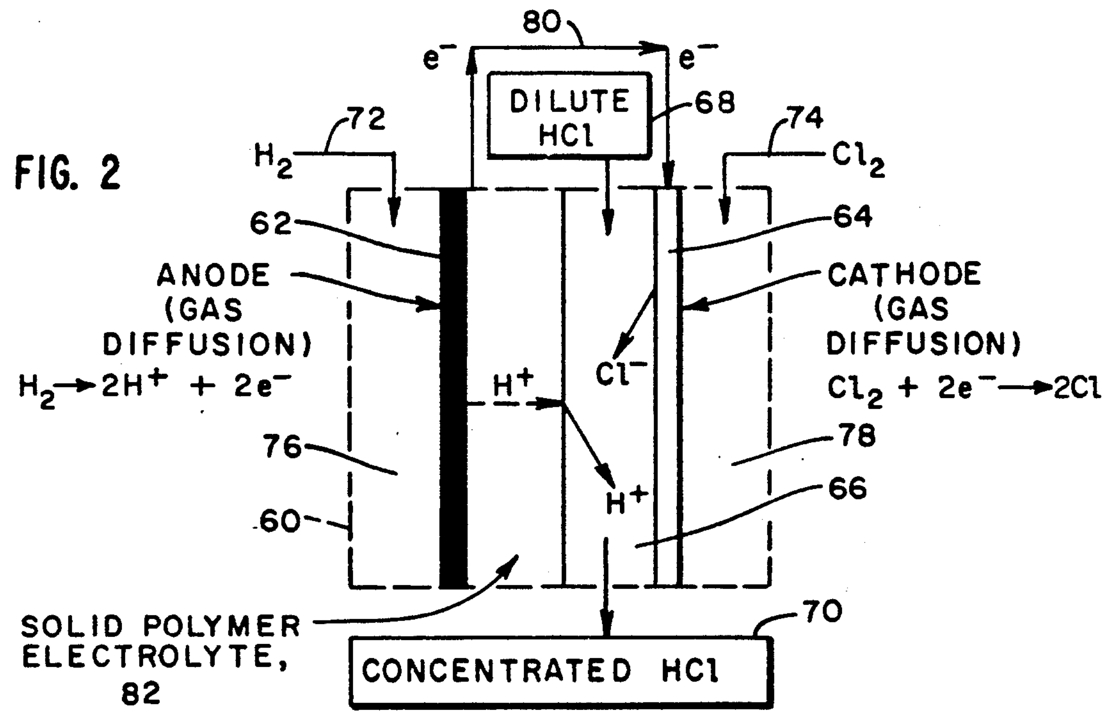
FIG. 2 is a diagram of the structure of the fuel cell according to one embodiment of the present invention.

The fuel cell 40 typically comprises a plurality of fuel cell elements of the type illustrated in FIG. 2. As shown there, an enclosure 60 contains anode and cathode electrodes 62 and 64 which define between them a channel or flow passage 66 through which hydrogen chloride electrolyte is passed from a dilute source 68 to a concentrated output 70. The concentrated output 70 forms the hydrogen chloride output which may be utilized as the input 42 to the electrolytic cell 12 in FIG. 1.

The electrodes 62 and 64, are of a gas diffusion design. Hydrogen and chlorine gases are supplied at respective inputs 72 and 74, and are typically portions of the outputs 26 and 28 of the electrolysis cell 12. The gas inputs 72 and 74 are applied to respective channels 76 and 78 which border respective surfaces of the electrodes 62 and 64 opposite from the surface which faces or borders the electrolyte channel 66. The hydrogen and chlorine gases transport across the gas diffusion electrodes 62 and 64, creating respective oxidation and reduction reactions that result in the generation of hydrogen and chlorine ions respectively as well as the respective generation and consumption of electrons creating a potential difference between the anode and cathode electrode 62 and 64 of approximately one volt. This electrical energy is harnessed through a circuit 80 for the production of useful work, typically replacing some of the electrical energy otherwise required from the external power network 32 of FIG. 1.

The anode and cathode electrodes 62 and 64 are preferably formed of metals of catalytic activity appropriate to the respective oxidation and reduction reactions at the anode 62 and cathode 64. In one preferred embodiment, the anode and cathode are graphitic carbon and carbon, respectively, having a very high microstructure surface area through microstructure surface convolutions, relative to the geometric length and width dimensions of the electrodes as a whole. The electrode surfaces may be platinum loaded carbon for enhanced catalytic activity by, for example, deposition or plating the electrode surfaces where they confront the electrolyte in the channel 66.

Chloride ions in the electrolyte within the channel 66 will typically migrate to the region approximate to the anode electrode 62, where the oxidation reaction of the hydrogen gas occurs. To prevent the disruptive effect of this migration, a barrier membrane 82 allowing only cations to pass through is typically applied to the surface of the anode electrode 62 facing the channel 66 as an exemplary solution. Such a membrane is typically a solid polymer electrolyte such as NAFION 117 (a trademark of the Dupont Co.).

Sodium chloride may be added to the input 68 of dilute hydrogen chloride of the fuel cell of FIG. 2. The dimensions of the fuel cell, electrodes, and their spacing, which should typically be kept in the scale of millimeters, are not critical but represent tradeoffs depending upon the current loading in the circuit 80 desired per area of electrode, and the relative outputs of electricity and hydrogen chloride desired for the individual fuel cell.

Figure 3:
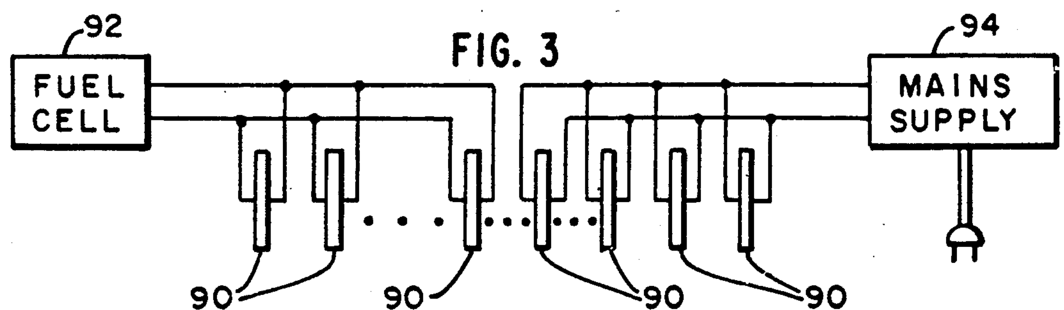
FIG. 3 is a circuit diagram indicating one form of application of the electrical energy output of the fuel cell of the present invention for utilization in an electrolysis chlorine generator.

The utilization of such a fuel cell to increase the efficiency of an electrolysis-based chlorine generator, in one application, is illustrated in FIG. 3. As shown there, the electrolysis chlorine generator is shown in typical implementation to include a plurality of electrolysis cells 90. The electrical output provided by one or more fuel cells 92 of the type described above is utilized to drive the electrolysis reaction of a subset of the electrolysis cells 90 while the remaining ones of the electrolysis cells 90 are supplied with direct current from the main supply 94 as rectified and appropriately reduced in voltage from the network 32. As thus shown, the utilization of the electrical output from the fuel cell of the present invention will replace a significant portion of the electrical demand of the chlorine generator, making for a substantial increase in efficiency in typical commercial utilization. It should be noted, however, that the electrical output of the fuel cell operating on hydrogen and chlorine outputs or a portion of them, from the typical hydrogen generator as well as the hydrogen chloride output may be diverted to other uses. In particular the electrical output, instead of replacing the electrical demands of some of the cells 90, may be utilized to drive pumps, blowers or other process equipment in the typical chlorine generating plant. In addition, the fuel cell of the present invention need not be directly connected to the hydrogen and chlorine outputs of a electrolysis generator but may receive the hydrogen and chlorine gas inputs by any desired means.

Accordingly it is intended not to limit the scope of the invention in any manner beyond that defined in the following claims.

I claim:

1. A hydrogen-chlorine fuel cell in combination with a hydrogen and chlorine electrolysis generator for supplying HCl and electricity for said electrolysis generator, comprising:

an electrolysis generator having chloride-containing aqueous electrolyte, at least one chlorine generating anode, at least one hydrogen generating cathode, and a central membrane between said anode and cathode;

a hydrogen-chlorine fuel cell for receiving hydrogen and chlorine produced by said electrolysis generator and for producing HCl and electrons at a potential, said fuel cell having hydrogen chloride electrolyte, an anode, and a cathode;

said fuel cell further including a chloride ion barrier located on said fuel cell anode between said anode and said electrolyte for preventing poisoning of said fuel cell anode by chloride ions and for promoting non-reversibility of the conversion of hydrogen and chlorine gas to hydrogen chloride electrolyte;

means for supplying to said hydrogen-chlorine fuel cell hydrogen and chlorine generated by said electrolysis generator;

means for applying the HCl from said fuel cell to said electrolysis generator in a location proximate to said at least one anode;

a power supply having electrical current inputs and outputs; and a driven loop for driving electrons from at least one electrolysis generator anode to at least one corresponding electrolysis generator cathode, said driven loop comprising an electrical connection between an electrical current input of said power supply and at least one electrolysis generator anode, and further comprising an electrical connection between an electrical current output of said power supply and said at least one electrolysis generator cathode corresponding to said anode; and means for supplying electrons from said fuel cell to at least one cathode of said electrolysis generator for use in driving at least a portion of the hydrogen and chlorine generation within said electrolysis generator.

2. Apparatus according to claim 1 wherein said barrier of said electrolysis generator is a diaphragm or membrane.

3. Apparatus according to claim 1 wherein said fuel cell includes a platinum catalyzed chlorine gas diffusion electrode.

4. Apparatus according to claim 1 wherein said fuel cell includes a graphite chlorine diffusion electrode.

5. Apparatus according to claim 1 wherein said means for supplying electrons from said fuel cell to at least one cathode of said electrolysis generator comprises a generating loop for electrically interconnecting said power supply to said fuel cell, said generating loop having an electrical connection between an electrical current input of said power supply and fuel cell anode and an electrical connection between an electrical current output of said power supply and fuel cell cathode.

6. Apparatus according to claim 1 wherein said electrolysis generator includes a plurality of electrolysis cells, a subset of which are electrically connected in parallel to said power supply, another subset of which are electrically connected to said fuel cell.

7. Apparatus according to claim 1 wherein said fuel cell includes one or more gas diffusion electrodes facing on one surface thereof an electrolyte containing hydrogen chloride and exposed on another opposite surface thereof to hydrogen or chlorine gas.

8. The apparatus of claim 7 further including:

a passage adjacent said opposite surface of said one or more gas diffusion electrodes; and means for applying hydrogen or chlorine gas to said passage.

9. Apparatus according to claim 7 wherein the anode of the fuel cell is a gas diffusion electrode.

10. Apparatus according to claim 1 wherein said fuel cell further includes:

first and second electrodes forming respectively fuel cell anode and cathode electrodes;

a flow channel defined between said anode and cathode electrodes; and means for establishing a concentration gradient of hydrogen chloride electrolyte along said channel in a direction parallel to said anode and cathode electrodes.

11. Apparatus according to claim 10, wherein said hydrogen chloride electrolyte includes sodium chloride.

12. Apparatus according to claim 1 wherein said fuel cell includes anode and cathode electrodes having ability to catalyze oxidation of hydrogen and reduction of chlorine respectively.

13. Apparatus according to claim 1 wherein the fuel cell for the production of hydrogen chloride and electrons from hydrogen gas and chlorine gas, comprises:

anode and cathode electrodes;

an electrolyte of aqueous hydrogen chloride or aqueous hydrogen chloride plus sodium chloride placed between front surfaces of said anode and cathode electrodes;

means for introducing hydrogen gas to said anode electrode and chlorine gas to said cathode electrode; and a chloride ion barrier placed on said anode electrode between said anode electrode and said electrolyte.

14. The fuel cell of claim 13 including means for maintaining a concentration gradient of hydrogen chloride in said electrolyte in a direction parallel to said anode and cathode electrodes.

15. The fuel cell of claim 13 wherein at least one of said anode and cathode electrodes is a gas diffusion electrode having hydrogen or chlorine gas respectively applied to a surface thereof opposite to the surface facing said hydrogen chloride electrolyte.

16. The fuel cell of claim 13 wherein at least one of said anode and cathode electrodes is graphitic, having a microstructure surface area substantially greater than the geometric surface area thereof and provided with or without a platinum coating.

17. A process for driving a hydrogen-chlorine fuel cell in combination with a hydrogen and chlorine electrolysis generator, for supplying HCl and electricity for the electrolysis generator, comprising steps of:

generating hydrogen and chlorine from an electrolysis generator having chloride-containing aqueous electrolyte, at least one chlorine generating anode, at least one hydrogen generating cathode, and a barrier between said at least one anode and cathode;

providing a fuel cell having hydrogen chloride electrolyte, at least one anode, and at least one cathode;

receiving in said fuel cell hydrogen and chlorine produced by said electrolysis generator, said fuel cell producing HCl and electrons at a potential;

providing in said fuel cell a chloride ion barrier located on said at least one fuel cell anode between said anode and electrolyte for preventing poisoning of said anode by chloride ions and for promoting non-reversibility of the conversion of hydrogen and chlorine gas to hydrogen chloride;

applying the HCl from said fuel cell to the electrolysis generator in a location proximate to said electrolysis generator anode; providing a power supply having an electrical current input and output for driving the hydrogen and chlorine generation in said electrolysis generator;

providing a driving loop between said power supply and said electrolysis generator by connecting an electrical current input to at least one electrolysis generator anode and connecting an electrical current output of said power supply to an electrolysis generator cathode corresponding to said anode; and supplying electrons from said fuel cell to said electrolysis generator for use in driving the reaction of said electrolysis generator.

18. The process according to claim 17 wherein said power supply is electrically connected in parallel to both of said electrolysis generator and said fuel cell.

19. The process according to claim 17 where the process for producing hydrogen chloride and electrons from hydrogen and chlorine gas comprises the steps of:

applying a relatively dilute chloride plus sodium chloride electrolyte solution to a channel formed between anode and cathode gas diffusion electrodes, said anode electrode having thereon a chloride ion barrier between said anode electrode and said electrolyte, to impede transport of chloride ions from said electrolyte to said anode;

applying hydrogen and chlorine gas respectively to anode and cathode gas diffusion electrodes from a side opposite said channel;

extracting a relatively concentrated hydrogen chloride solution from a region between said anode and cathode electrodes remote from the point of application of said dilute hydrogen chloride solution; and forming a circuit for a flow of electrons from said anode to said cathode external of said electrolyte.

20. The process according to claim 17 where the process for converting hydrogen and chlorine gas to hydrogen chloride and electrons comprises the steps of:

applying a relatively dilute hydrogen chloride solution to a passage formed between an anode and a cathode electrode, at least said anode being a gas diffusion electrode;

applying chlorine gas to said hydrogen chloride solution in the vicinity of said cathode electrode;

applying hydrogen gas through said gas diffusion anode electrode into said hydrogen chloride solution;

impeding the flow of chloride ions in said hydrogen chloride solution to said anode electrode;

extracting from said hydrogen chloride solution, hydrogen chloride of a relatively more concentrated nature from a location remote from the place of application of said relatively dilute hydrogen chloride solution; and forming a circuit for the flow of energetic electrons from said anode electrode to said cathode electrode external of said hydrogen chloride solution.

* * * * *

UNITED STATES PATENT AND TRADEMARK OFFICE

CERTIFICATE OF CORRECTION

PATENT NO. : 5,041,197

DATED : August 20, 1991

INVENTOR(S) : Alan H. Gelb

It is certified that error appears in the above-identified patent and that said Letters Patent is hereby corrected as shown below:

On the title page:
In the identification line [54] in the Title, "$H_2/C_{12}$" should read --$H_2/Cl_2$--; and "HCL" should read --HCl--.

Column 1, line 1, "$H_2/C_{12}$" should read --$H_2/Cl_2$--; and "HCL" should read -- HCl--.

Column 1, line 27, "typically with" should read --typically provided with--.

Column 3, line 13, "electrolysis, based" should read --electrolysis-based--.

Column 4, line 21, "approximate" should read --proximate--.

Column 7, line 22, "input to at least" should read --input of said power supply to at least--.

Column 7, line 36, "dilute chloride" should read --dilute hydrogen chloride--.

Signed and Sealed this

Twenty-eighth Day of December, 1993

Attest:

BRUCE LEHMAN

Attesting Officer

Commissioner of Patents and Trademarks